(12) United States Patent
Pirkenseer et al.

(10) Patent No.: US 10,244,672 B2
(45) Date of Patent: *Apr. 2, 2019

(54) METERING SYSTEM FOR AN AGRICULTURAL MACHINE

(71) Applicant: Horsch Maschinen GmbH, Schwandorf (DE)

(72) Inventors: Manfred Pirkenseer, Burglengenfeld (DE); Philipp Horsch, Schwandorf (DE)

(73) Assignee: Horsch Maschinen GmbH, Schwandorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/000,255

(22) Filed: Jun. 5, 2018

(65) Prior Publication Data

US 2018/0279545 A1    Oct. 4, 2018

Related U.S. Application Data

(63) Continuation of application No. 15/007,733, filed on Jan. 27, 2016, now Pat. No. 10,010,024.

(30) Foreign Application Priority Data

Jan. 28, 2015   (DE) ................. 10 2015 101 255
Jan. 28, 2015   (DE) ................. 10 2015 101 256

(51) Int. Cl.
*A01C 7/04*  (2006.01)
*A01C 5/06*  (2006.01)
(Continued)

(52) U.S. Cl.
CPC ............. *A01C 7/046* (2013.01); *A01C 5/064* (2013.01); *A01C 7/206* (2013.01); *A01C 15/00* (2013.01); *A01C 21/005* (2013.01)

(58) Field of Classification Search
CPC ......... A01C 7/046; A01C 7/044; A01C 7/042; A01C 7/04; A01C 7/00; A01C 5/064;
(Continued)

(56) References Cited

U.S. PATENT DOCUMENTS

| | | |
|---|---|---|
| 3,422,776 A | 1/1969 | Gregory, Jr. |
| 4,399,757 A | 8/1983 | Maury |

(Continued)

FOREIGN PATENT DOCUMENTS

| | | |
|---|---|---|
| DE | 8108744 U1 | 7/1981 |
| DE | 102007062967 A1 | 6/2009 |

(Continued)

*Primary Examiner* — Christopher J. Novosad
(74) *Attorney, Agent, or Firm* — Erickson Kernell IP, LLC; Kent R. Erickson

(57) ABSTRACT

A metering system for a row unit for individual dispensing of grains comprises metering devices having a chamber for carrying grains, whereby a defined pressure level in the chamber is higher than ambient pressure. At least two metering elements establish a border to the chamber, whereby the metering elements are arranged within the housing so that they can be turned and the metering elements consist of cut-outs arranged along a curved path for picking up grains. At least one grain dispensing area is intended, which is defined by the chamber and the metering elements. The grain dispensing area includes a seed inlet element for transporting separated grains to a seed metering pipe to dispense the separated grains into a furrow, whereby a pressure application device is arranged at the seed inlet element or the seed metering pipe, to produce an air stream for the acceleration of the grains.

14 Claims, 10 Drawing Sheets

(51) Int. Cl.
 *A01C 7/20* (2006.01)
 *A01C 15/00* (2006.01)
 *A01C 21/00* (2006.01)

(58) Field of Classification Search
 CPC .. A01C 5/062; A01C 5/06; A01C 5/00; A01C 7/206; A01C 7/20; A01C 15/00; A01C 21/005; A01C 21/00
 See application file for complete search history.

(56) References Cited

U.S. PATENT DOCUMENTS

| | | |
|---|---|---|
| 6,672,228 B1 | 1/2004 | Groelz et al. |
| 7,765,943 B2 | 8/2010 | Landphair et al. |
| 9,043,950 B2 | 6/2015 | Wendte et al. |
| 9,237,687 B2 | 1/2016 | Sauder et al. |
| 10,010,024 B2 * | 7/2018 | Pirkenseer ............. A01C 7/046 |
| 2012/0048161 A1 | 3/2012 | Shoup |

FOREIGN PATENT DOCUMENTS

| | | |
|---|---|---|
| EP | 1928223 B1 | 6/2008 |
| WO | 2011037525 A1 | 3/2011 |
| WO | 2014113803 A1 | 7/2014 |
| WO | 2014205454 A1 | 12/2014 |

* cited by examiner

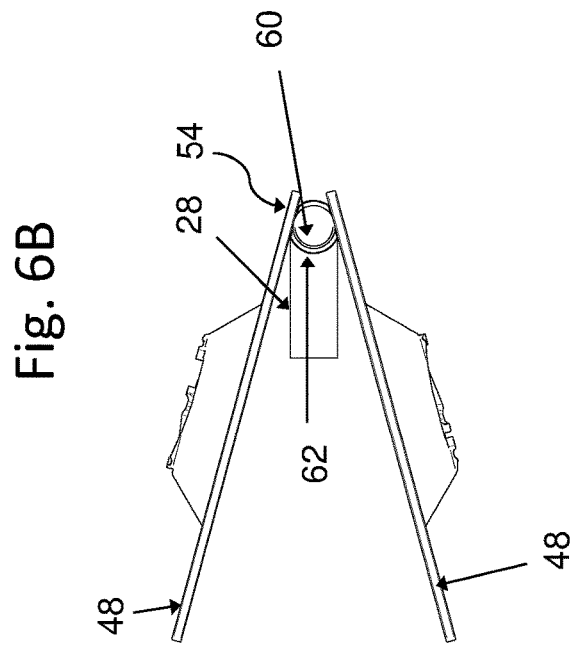
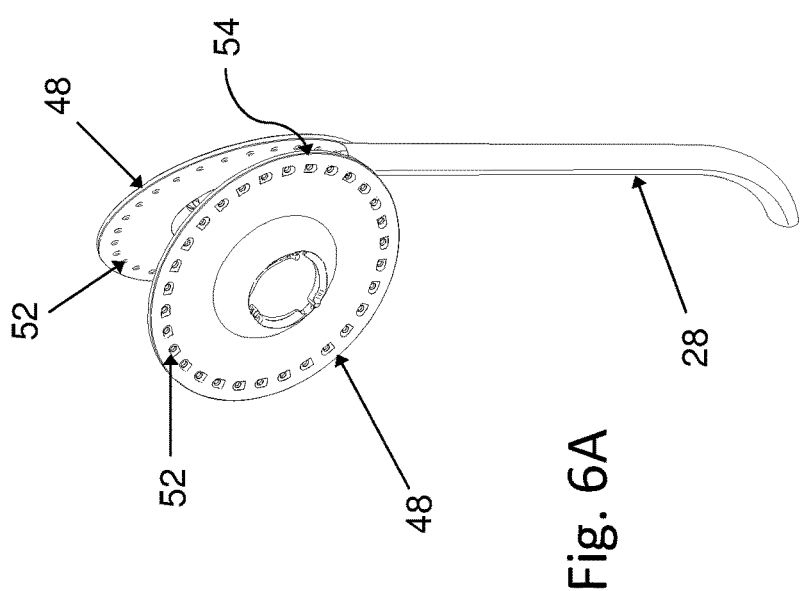

METERING SYSTEM FOR AN AGRICULTURAL MACHINE

CROSS-REFERENCE TO RELATED APPLICATIONS

This application is a continuation of U.S. application Ser. No. 15/007,733, filed Jan. 27, 2006 which claims priority from German Application Nos. DE 10 2015 101 255.3 filed Jan. 28, 2015 and DE 10 2015 101 256.1 filed Jan. 28, 2015, the contents of which are incorporated herein by this reference.

FIELD

The present invention relates to a metering system for a row unit of an agricultural machine for an individual dispensing of granular material with the characteristics of the independent claim 1.

BACKGROUND

A variety of procedures, methods or machines are known in agriculture for dispensing or distributing of seeds and fertilizer in granular form in a most even way on a farmland area. One kind of these machines is called a seed singulating machine. In the case of seed singulating machines, it is possible to single out grains by means of metering devices and to place these in regular intervals into a seed furrow. Generally, the seed furrow is produced by means of appropriate furrowing tools. In this way, almost all the seeds are provided with about the same growing space, which ensures a uniform development of the plants.

In addition to the growing space, the selection of the best suited seeds for the respective location is also crucial for the development of the plants. For example, there are some kinds of seeds that are better suited for rather dry and others for moist soil conditions. Some kinds of seeds are also better suited for heavy clay-like soils and others for rather light sandy soils. But since the soil conditions can often be varied, in particular in the case of fields that cover a large area, it would be advantageous if the kinds of seeds could be adapted within the field according to the respective soil condition.

A variety of approaches to solve this are known from prior art. U.S. Pat. No. 6,672,228 B1, for example, describes a metering system for a row unit, wherein the metering system consists of two metering devices. For example, by means of a carousel, it is possible to supply different kinds of seeds to the respective metering devices. After separating the seeds, the individual grains are placed in a seed pipe so that the seeds can be transported into the seed furrow. When there is a change of the seeds dispensing into the seed pipe from the first metering device to the second metering device, these can be respectively moved in an axial direction by means of a slider. The device is characterized in that when individual seed dispensing is performed in the first metering device, the second metering device does not perform any separation or vice versa, which means that only one respective metering device is active at a time.

Although it is thus possible to dispense different kinds of seeds, the moving of the metering device and of the carousel makes a quick change between the two metering devices or between the different kinds of seeds impossible. At faster driving speeds and frequent changes of seeds, it is possible that there are inaccuracies in the seed dispensing due to the time that is necessary for changing of the metering devices. The design of the row unit with slider and carousel is also often very extensive and thus also correspondingly costly. Furthermore, there is a problem with the seed dispensing because it occurs in the seed pipe in a free fall. Due to vibrations and impacts which can occur in the row unit during driving in the field, it is possible that the seeds are misplaced within the seed pipe or that the seeds collide within the seed pipe. This can also result in an uneven grain dispensing.

Another metering device by means of which seeds can be dispensed in a metered or individual manner is known from U.S. Pat. No. 7,765,943 B2. In this device, the seeds can be volumetrically metered by means of a rotary valve or it can be separated by means of a metering unit. The supply of the seeds is regulated by a slide, whereby either a volumetric metering or a separation of the seeds is performed, depending on the position of the slide.

A further agricultural machine with two metering devices has been known through the US-based company "Kinze Manufacturing Inc.". In their so-called Multi-Hybrid Planter 4900, two metering devices comprise one common seed dispensing area. The metering devices are operated by means of low pressure systems respectively. After the grains are dispensed from one metering unit, they are placed into the seed furrow by means of a free fall through a seed metering pipe. The switching between the metering devices or the kinds of seeds is performed, for example, by means of GPS-data. Yet, low pressure metering devices have the disadvantage that they are very susceptible to dirt. In particular, dirt particles can be sucked in by means of the low pressure in the metering device, which can lead to malfunctions.

From WO 2014 113 803 A1, a further metering system for a row unit is known. This metering system can be supplied with at least two different kinds of seeds, whereby only one kind of seed can be dispensed with the respective metering device. However, this system has the disadvantage that a quick switching between the kinds of seeds is not possible because there is only one metering device. Rather, a respective waiting-time must be defined, in order to take into account the time that is required for the grains to reach from the central seed tank to the metering device. But such a system is very complex and it is also error-prone if the timings are not chosen correctly.

Another metering system is known from WO 2014/205454 A1, which comprises two metering devices. The two metering devices are arranged with a distance between each other and both use the vacuum principle. It is thus possible that the seeds can be accommodated by the cut-outs of the metering elements. The seeds that are captured by the cut-outs can then subsequently fall into one common seed metering pipe or into two separate seed metering pipes by means of gravity.

Other systems are also known from prior art, in which two streams of seeds are connected by means of a Y-piece, whereby these are generally metered volumetrically. Also, a connection of the streams of seeds is not yet synchronized, which means that single grain dispensing cannot be guaranteed. It is also already known that, for example, micro granules are added into a stream of individual grains. Up to now, a separated grain dispensing of these two compounds can also not be guaranteed in this case. Additionally, the stream of individual grains can possibly be affected, by means of which a sufficiently accurate seed dispensing can no longer be ensured.

SUMMARY

It is the objective of the present invention to present a metering system for a row unit of an agricultural machine, which is arranged with at least two metering devices and/or metering units for an individual dispensing of the grains. The metering system should thereby be designed in such a way that a switching of the individual seeds dispensed from the at least one first to the at least one second metering device can be accomplished as quickly as possible. At the same time, a bouncing of the grains within the seed pipe should be prevented as much as possible. These objectives of the invention are achieved by means of the characteristics of the independent claim 1. Characteristics of advantageous developments of the invention are derived from the dependent claims. To achieve the above-mentioned objectives, the present invention presents a metering system for a row unit of an agricultural machine, preferably in the form of a seed singulating machine. The row unit is connected to the agricultural machine by means of a frame, whereby the connection between the row unit and the frame is accomplished by means of a support device. The support device can be designed, for example, in the form of a rhomboid.

The metering system consists of at least two metering devices, which can be mounted onto the row unit. Alternatively, the at least two metering devices can also be set at a distance to the row unit and can be arranged to the machine and/or to the frame of the machine instead. It is possible to supply the at least two metering devices with seeds from a seed reservoir via certain seed supply lines. Preferably at least two metering devices are supplied with different kinds of seeds, so that the seeds can be adapted to the different soils while driving on the field.

The at least two metering devices consist of at least one chamber for receiving the grains for dispensing. Depending on the embodiment, the at least two metering devices can consist of one common chamber or of one respective chamber, whereby each one of the respective chambers is supplied with the seeds from the seed reservoir that are to be dispensed. If the metering devices consist of one common chamber, they are separated by means of a dividing element. The purpose of the dividing element is to prevent the mixing of the different kinds of seeds. Various elements can serve as dividers, preferably such that prevent the different kinds of seeds from being mixed but that still allow air to flow from one chamber into the next.

The at least one chamber is further characterized by a defined pressure level that is higher than the ambient pressure. Thus, the at least one chamber is pressurized, which can be accomplished by means of a corresponding pressure application device, for example, in form of a high pressure blower. It would also be possible to apply the opposite side of the chamber with a lower pressure by means of a vacuum blower. In any case, the at least one chamber or the two chambers should be designed in such a way that the pressure level $P1$ in the chamber is greater than the pressure level $P2$, which prevails in the area that is opposite of the chamber.

So if a pressure application device is mentioned in connection with the present description, it refers to any kind of high pressure or vacuum device, which can produce the desired high or low pressure within the chambers. Whether this high pressure or vacuum is produced by means of a blower or any other means is not of primary importance in the present context.

The metering system according to the invention further consists of at least two metering elements. The at least two metering elements are arranged in such a way within the housing of the at least two metering devices that they can be turned, or that the at least two metering elements can rotate around a respective rotational axis. The at least two metering elements can be preferably designed in a disc- and/or drum- and/or plate-like manner. It is also possible that the at least two metering devices are arranged with different metering elements. The at least two metering elements are equipped with cut-outs, which are arranged along a curved path at regular intervals. These cut-outs can be designed in the shape of bore holes and/or elongated holes and/or slots, or the like, so that they can receive individual grains which were supplied to the at least two respective metering devices. The cut-outs can further be arranged in different sizes and contours which are adapted to or chosen according to the respective materials that are to be dispensed.

A border for at least one of the chambers is formed by the at least two metering elements, which means that the metering element is the border of the respective chambers. The metering system further consists of at least one grain dispensing area which is defined by the at least one chamber and by the at least two metering elements. A respective connection to an area with a lower pressure level $P2$ than that of the chambers is achieved by means of the cut-outs. Thus, a pressure difference occurs in the cut-outs of the at least two metering elements. The pressure difference assists the receiving of grains by the respective cut-outs. The grains which are in the chamber can thus be picked up by the respective cut-outs of a metering element and can be transported to the at least one seed dispensing area by the rotation of the metering element. A pressure difference at the cut-outs can subsequently be interrupted by means of appropriate interrupting elements, whereby the grains are then pushed out of the cut-outs into the seed inlet element or into the seed metering pipe.

While only one grain dispensing area is formed for the metering system according to the invention with one common chamber, two respective grain dispensing areas are formed for the metering system with two chambers.

A separating device and/or a separating element can preferably be arranged between the grain pick up and the grain dispensing area. The separating device and/or the separating element ensures that excess grains which are sticking to the cut-outs can be expelled. This separating device can be designed in a variety of ways, whereby this one corresponds to the preferred embodiment as it is known from EP 1 928 223 B1, whereby also other separating devices would be possible.

The present object is characterized in that at least one grain dispensing area is arranged at at least one seed inlet element for receiving and transporting the separated grains to a seed metering pipe in order to dispense the separated grains into a seed furrow in the soil which was prepared by means of soil cultivation tools. Hereby, the at least one seed inlet element and/or the seed metering pipe is arranged at a pressure application device by means of which an air stream for the acceleration of the grains can be produced.

If the metering system according to the invention forms at least one common chamber and thus also one common grain dispensing area, then only one seed inlet element is necessary. This seed inlet element is defined by the upper section of the seed metering pipe.

For a metering system with one common chamber and thus with one common seed dispensing area this particularly means the following:

The invention intends that the at least two metering devices consist of one common seed dispensing area, which means that different kinds of seeds are separated by the respective metering devices and then transported to the common seed dispensing area. Afterwards, the separated material is led into the seed metering pipe, whereby the upper section of the seed metering pipe is defined as the seed inlet element. The seed dispensing can be accomplished by means of only one respective metering device, or also by means of two metering devices. The advantage of such an arrangement is that it is possible to quickly switch between the metering devices or between the kinds of seeds. Furthermore, the row unit or the metering system can be designed in a simple way, since no further tools are needed for the switching or changing of the kinds of seeds. A switching can be accomplished, for example, by means of a turning off of the motor of one of the metering devices. The common seed dispensing area can be pressurized with a defined pressure level that is higher than the ambient pressure, for example, in form of some kind of high pressure. The defined pressure level can be produced, for example, by means of a separate connector or by a connection with the chambers. By means of this defined pressure level, an air flow is produced within the seed metering pipe, by means of which the grains are accelerated after being released from the metering element and after being dispensed into the seed metering pipe. This largely prevents a bouncing of the grains within the seed metering pipe or at least reduces it to such an extent that it does not have any, or at least only an insignificant influence on the dispensing accuracy.

If the metering system according to the invention forms two chambers and thus also two seed dispensing areas, two corresponding seed inlet elements are necessary. By means of a corresponding embodiment it is possible to join the two seed inlet elements into one seed metering pipe.

To accomplish this, the invention intends that the at least two metering devices and/or the at least two metering elements are arranged with some distance between each other and that they are possibly not mounted directly on the row unit. The metering devices consist of one respective seed dispensing area with a seed metering pipe or with a seed inlet element that is arranged at it, which means that each seed dispensing area is arranged with one respective seed inlet element. The two seed inlet elements are hereby united into one common seed metering pipe within their further course. A Y-shaped element can preferably be used as connecting piece. Other connecting pieces would also be possible, whereby their respective shape should be designed in such a way that the at least two seed inlet elements are united into a common seed metering pipe. The joining into one seed metering pipe can also be performed at some distance from the other. The seed inlet elements can also be made with different lengths. The seed metering pipe can also be designed in such a way that it forms a seed inlet element and that at least one second seed inlet element is connected to it, by means of which only one additional pipe would be needed. This connection can also be made in a Y-shape and can be described as connecting piece. It is thus possible that the separated grains can be dispensed via one common seed metering pipe into the furrow in the field that was produced by the soil cultivation tools.

The connection can be done directly after the metering devices or at some distance to these. If, for example, the metering devices are arranged with some distance between the row units, a connection could be done at the row unit. The advantage of such an arrangement is that it is possible to quickly switch between the metering devices or the kinds of seeds. Furthermore, the row unit or the metering system according to the invention can be designed in a simple way, since no further tools are needed for the switching or changing of the kinds of seeds. As in the case with the embodiment with one common chamber or with one common seed dispensing area, a quick switching can be performed by turning off of the motor of the respective metering element.

Furthermore, it is possible that one seed dispensing area is pressurized by a defined pressure level that is higher than the ambient pressure, for example, in the form of a high pressure blower. Comparable to the embodiment with one common chamber, the defined pressure level that is higher than the ambient pressure can be produced by means of a separate connector or by a connection of the chambers. By means of this defined pressure level, an air flow is produced within the seed metering pipe, by means of which the grains are accelerated after being released from the metering element and after being dispensed into the seed metering pipe. Furthermore, this largely prevents a bouncing of the grains within the seed metering pipe or at least reduces it to such an extent that it does not have any or at least only an insignificant influence on the dispensing accuracy.

It is also possible that the at least two metering devices are designed in the form of vacuum metering devices, in which the pressure level P2 is a vacuum and the pressure level P1 is greater than the pressure level P2. In order that the grains can also be accelerated within the seed metering pipe in this case, it is possible that the common seed dispensing area or at least one seed dispensing area from the two seed dispensing areas is equipped with a separate air supply. It would also be possible that the seed metering pipe or the at least one seed inlet element is arranged with a pressure application device. For example, this can be accomplished in the form of a Venturi or a ring nozzle, by means of which the grains are accelerated within the seed metering pipe. The air flow or the air pressure can preferably be regulated, by means of which the speed of the grains within the seed metering pipe can be influenced.

The invention further intends that the air flow within the seed metering pipe can be adapted. To accomplish this, different solutions are possible. For one, the seed dispensing area can be actively connected to at least one chamber, so that the pressure level in the metering device on the side facing towards the grains is almost equal. It would also be possible that the seed dispensing area is connected to the pressure generator or to the air supply pipe of the chambers by means of a separate pressure connection. It is thus possible that there are different pressure levels between the chamber and the at least one seed dispensing area or the one seed dispensing area. The additional connection may also consist of an adjusting element, by means of which the air stream or the air pressure within the seed metering pipe can be adjusted.

In one preferred embodiment, at least one seed dispensing area is connected to a chamber or the seed inlet is arranged within the chamber of the metering device, by means of which the pressure in the chamber is also used to produce the air stream within the seed metering pipe.

The cut-outs in the metering elements are arranged along a circular or curved path, whereby the seed metering pipe or the seed inlet element is arranged at least partially in a tangential way towards at least one of the curved paths. The seed metering pipe consists of one seed inlet and one seed outlet, whereby these preferably feature a round cross section. But other cross sections would also be possible, for example, square or rectangular shapes. The cross section of the seed metering pipe can also change within its course. It can become bigger or smaller. It is thereby possible to change the speed of the grains within the seed metering pipe. The seed metering pipe can also feature different radii, by means of which the grains can be led along the seed metering pipe, which can prevent a bouncing of the grains. In the present object, the seed metering pipe is curved in a sickle- and/or bow-shape at least in some sections.

In the case of one common chamber or one common seed dispensing area, the invention further intends that the seed metering pipe or the seed inlet is designed in such a way that it enlarges within the seed dispensing area and then narrows down in its further course. The advantage of this is that there is sufficient space for the grains in the dispensing area to be securely received by the seed metering pipe. In the center of the widened area, it is possible, for example, to arrange for an intermediate piece which divides the seed metering pipe. In this way it is possible to achieve a suction effect by means of the air stream that occurs in the area of the grain dispensing, which ensures a smooth grain dispensing.

It can further be intended that the seed inlet is aligned at the disc in such a way that the disc touches and slides on it. In the case of one common chamber or of one common seed dispensing area, this would mean that the distance of the at least two metering elements towards each other at the seed dispensing area is lesser than the diameter or the cross section of the seed metering pipe or of the seed inlet. In both embodiments it would also be possible that the seed metering pipe features a round cross section, which would then be interrupted on the side that faces towards the disc. The grain dispensing of the metering element into the seed metering pipe can thus be greatly improved, since possibly interfering edges, which would otherwise be present between the seed metering pipe and the metering element are omitted in this way.

In the case of two chambers or of two seed dispensing areas, it would also be possible that the metering element does not touch and slide on the seed inlet element. But in order to prevent any edges of the seed inlet element at the metering element in such an arrangement, it can be aligned at an angle. It would also be possible that the seed inlet element is designed with a beveled edge and thus the thickness of the edge would also be reduced.

As mentioned earlier, the two metering devices and/or the at least two metering elements can consist of one common housing or can be arranged within one common housing. Thus, the two metering elements would be integrated in one constructional unit. The chambers of the metering device are separated by a dividing wall in this case in order to prevent a mixing of the different kinds of seeds. The kinds of seeds are stored in a seed reservoir and can be supplied to the chambers at any time. The dividing wall is preferably designed in such a way that air can pass through it. Thus, only one central air supply is needed for the at least two metering devices, so that the piping effort of the machine can be reduced.

In the course of the seed metering pipe and/or of the at least one seed inlet element, at least one sensor element can be arranged for, by means of which the grain dispensing or the grain transport can be monitored. The at least one sensor element is preferably designed as an optical sensor element. The derived values of the at least one sensor or of the sensors can among others be used to adjust the speed of the metering elements accordingly and thus it is possible to improve the dispensing accuracy. In like manner, many different other applications are possible as well.

The at least two metering devices may include many different embodiments. Thus, metering devices which work according to the high pressure and/or the vacuum principle or which feature a combination of the high pressure and the vacuum principle are conceivable. Mechanically working metering devices would also be possible, in which the grain separation is performed, for example, by the so-called "finger pick up". Also centrifugal-based metering devices are conceivable or possible, in which the acceleration of the grains can be achieved by the rotation speed of the metering element.

The at least two metering devices can work according to the same principle and may consist of basically the same setup. It is thus possible that the metering devices feature a respective first area in which the grains are picked up by means of a pressure difference from the cut-outs in the metering element. The at least two metering devices further consist of a second area in which a transport of the grains towards the seed dispensing area is performed by means of the metering element. To accomplish this, a rotation of the metering element by means of some kind of drive is necessary. This drive for the metering element can be a motor, an electric or hydraulic drive, etc. This area is equipped with a separating device and/or with separating elements. One of the purposes of the separating device or of the separating elements is to expel excess grains from the cut-outs. This is done in such a way that only one respective grain remains in the cut-outs. The at least two metering devices feature a third area, which is arranged with at least one interrupting element for the interruption of the pressure difference at the cut-outs. The at least one interrupting element can be designed, for example, in the form of a roller. An interruption of the pressure difference has the effect, that the grains, which are located in the cut-outs, fall into the seed metering pipe by means of the seed inlet element. Alternatively, it is also possible that an air blast pushes the grains out of the cut-outs. A fourth area is characterized in that the grains and/or the air stream are redirected from a circular path and from a perpendicular air stream into a guided transporting direction and a guided air stream in the direction of the seed metering pipe. Furthermore, there is a fifth area that is arranged with a seed inlet of the seed metering pipe and with a section of the seed metering pipe for transporting the grains towards a seed furrow.

In the case of one common chamber, at least two of the third, fourth and fifth areas or in the case of two chambers, the third, fourth and fifth area, can hereby form the common seed dispensing area. For example, the areas thereby encompass an area that amounts to at least 75°. But bigger or smaller angles would also be possible.

The at least two metering devices can be arranged facing towards each other in a mirror image-inverted way and/or twisted about their respective axes, or preferably the axis of the seed metering pipe and/or parallel relative to each other and/or at an angle and/or in a combination thereof. The sides with the chambers are preferably facing each other.

The invention intends that at least one of the at least two metering devices or at least one metering element is arranged with a motor drive. Thus at least one of the at least two metering devices or at least one metering element can be powered with a motor drive. Electrically, hydraulically or mechanically working drives would also be conceivable. It is further possible that transmission devices are used to transmit the motion of the at least one powered metering device to the second metering device. Clutches or belts or transmissions or gear wheels can be preferably used as transmission devices. It would also be possible that the at least two metering devices are arranged with a respective separate drive, which means that each metering device can be powered by means of a separate drive. This would have the advantage that the metering devices could be operated at different speeds depending on the kind of seeds used.

Additional aids, such as transmission gear boxes or the like would not be necessary in this case.

In order to create an energy efficient row unit or an energy efficient metering system, it would be necessary that the motor drives of the metering elements are coupled in such a way that the braking energy of the one first drive can be used as starting energy for the second drive and vice versa. In the same manner, the motion of one metering device could also be used as energy producer for the other metering device.

The at least two metering devices are coupled in such a way that an individual grain dispensing can be performed into the seed inlet element or into the seed metering pipe by means of at least one metering device, respectively. The speeds of the at least two metering elements are adapted relative to each other in such a way that when the grain dispensing is switched from one metering element to the other, the grain dispensing is synchronized, which means that the desired spacing of the grains can also be maintained during a switching process. In order to improve this ability, the at least two metering devices or the cut-outs of the at least two metering elements can be filled with grains until directly before the interrupting element or up to the seed dispensing area. But there is only one grain dispensing or one interruption of the pressure difference at one metering device, respectively, which means that the interrupting element pushes the grains only out of the cut-outs of one metering element, respectively. In like manner, it is possible that for a simultaneous grain dispensing of the at least two metering elements, respectively, these are synchronized in such a way that the grains are dispensed into the seed inlet element alternately. Thus, in the case of a simultaneous grain dispensing, the interrupting elements of both chambers also have to be adapted relative to each other, which would mean that the interrupting elements would have to produce a respectively alternate interruption of the pressure difference. For example, this can be accomplished by means of a corresponding sensor arrangement in connection with a control device.

The desired switching between the kinds of seeds or between the at least two metering devices is preferably done my means of GPS-data or by means of any other satellite system or position detecting system. The switching positions could also be stored in a computer unit, and a switching could be accomplished in this way. A manual switching by an operator would likewise be possible. The switching between the at least two metering devices is necessary in order that it is possible to switch between the different kinds of seeds.

In order to prevent a possible collision of the grains after a switching of the grain dispensing from one metering device to the other, it is possible that the metering elements of the at least two metering devices are turning in the opposite direction of the respective other one, at least for a certain time. This means that the metering element by means of which a grain dispensing is to be done would turn, for example, clockwise, while the other metering element, which should no longer dispense any grains, would at least for a short time turn counter clockwise. A collision of the grains can be prevented in this way. Afterwards, a metering element could be fully deactivated by means of turning off the motor. Due to the working together of the two metering elements, different kinds of grains can be dispensed while driving on the field.

Furthermore, the at least two metering devices can be designed in such a way that the sides with the respectively lower pressure level are connected to the respective chambers of the other metering device and/or to the air supply. It would also be possible that the areas with a lower pressure level are in turn connected to a vacuum area of the pressure application device. It is further possible that the sides of the at least two metering elements with the lower pressure level, or the sides of the at least two metering elements that are facing away from the grains, are equipped with some means so that the cut-outs in the areas where no grains are to be transported can be covered, or that the pressure difference can be stopped or reduced in these areas. Such areas could be located, for example, between the grain dispensing and the grain pick up. But it is also possible that other parts could be covered, for example, in the case when no grains should be transported or separated.

For example, the supply of the at least two metering devices with seeds can be done by means of a pneumatic conveyor system. An additional container for receiving and storing grains can also be arranged for each metering device. It would likewise be conceivable that at least one metering device is supplied by a pneumatic conveyor system and the second metering device is supplied by an additional container. This would be advantageous if, for example, much more would be needed from one kind of seeds than from the other kind, so that the seeds with the heavy consumption would be supplied by a pneumatic conveyor system, wherein these seeds are provided in a big tank that is attached to the machine. The activation of the at least two metering devices could likewise be performed in such a way that when an interruption occurs during the supply of the seeds for the first metering device, the one second metering device will be automatically activated. Furthermore, the air supply for the pneumatic conveyor system could also be used to support the defined pressure level in the chamber.

In addition to the metering system, which is arranged at it, the row unit also consists of furrowing tools, preferably two coulters which are aligned towards each other at an angle. They form a so-called double disc pair. But it would also be possible to use the present invention with a so-called single disc coulter or with a tine coulter. The seed metering pipe is arranged, for example, between the two or next to the one disc, whereby the seed outlet on the other hand is arranged within or directly next to the at least one outer contour of the at least one disc. A catching element is further arranged directly behind the coulters or the tines or it reaches into these and/or it is arranged next to it and it is designed, for example, in the shape of a roller. It is arranged in such a way that the stream of grains and/or the air stream is basically directed tangentially with regards to the outer contour or the catching element.

A change of direction of the grains occurs in the seed dispensing area, which means that the grains are redirected from a circular motion along a curved path into a mainly tangential and/or straight direction with regards to the curved path. This is accomplished by means of a change of direction of the air streams which are directed as respective perpendicular air streams towards the cut-outs inside the chambers, into a guided air stream. This air stream is directed along the seed metering pipe and/or along the guiding element that is arranged at the at least one seed dispensing area. Additionally, the guiding element features a guiding path which at least partially follows the same direction as the at least one seed inlet element. A good air stream can be produced in this way, whereby the air stream can also be produced, for example, by an active connection with at least one chamber. But a separate air supply would also be possible.

Furthermore, the curved path, the guiding element and the seed metering element are arranged in such a way that any element, such as grains, dirt particles or the like, which reach the grain dispensing area, are forcibly dispensed via the guiding path into the seed metering element. This reduces the susceptibleness to dirt tremendously. In order to further improve the susceptibleness to dirt, a push-out roller or a push-out element can be arranged for the at least two metering elements or for the seed dispensing areas on the respective side that is facing away from the grains. By means of these, any grains and/or dirt particles that possibly remain in the cut-outs after the grain dispensing, can be removed and dispensed into the seed metering pipe.

BRIEF DESCRIPTION OF DRAWINGS

Subsequently, the invention and its advantages will be further explained by means of the embodiments and the attached figures. The ratio of the sizes of the individual elements in relation to each other in the figures does not always correspond to the real size ratios since some shapes have been simplified and other shapes have been enlarged in relation to other elements for better illustration.

FIG. 6A depicts an angled arrangement of the metering elements towards each other in a simplified perspective view and FIG. 6B is a simplified top view thereof.

DETAILED DESCRIPTION

For elements of the invention that are the same or that function in the same way, identical reference numbers will be used in the FIGS. 1 to 10. Additionally, for a better overview, only reference numbers which are needed for the description of the respective figure are depicted in the individual figures. The depicted embodiments only represent illustrations of how the metering system according to the invention can be designed, and do not represent any final limitation.

Figure 1:
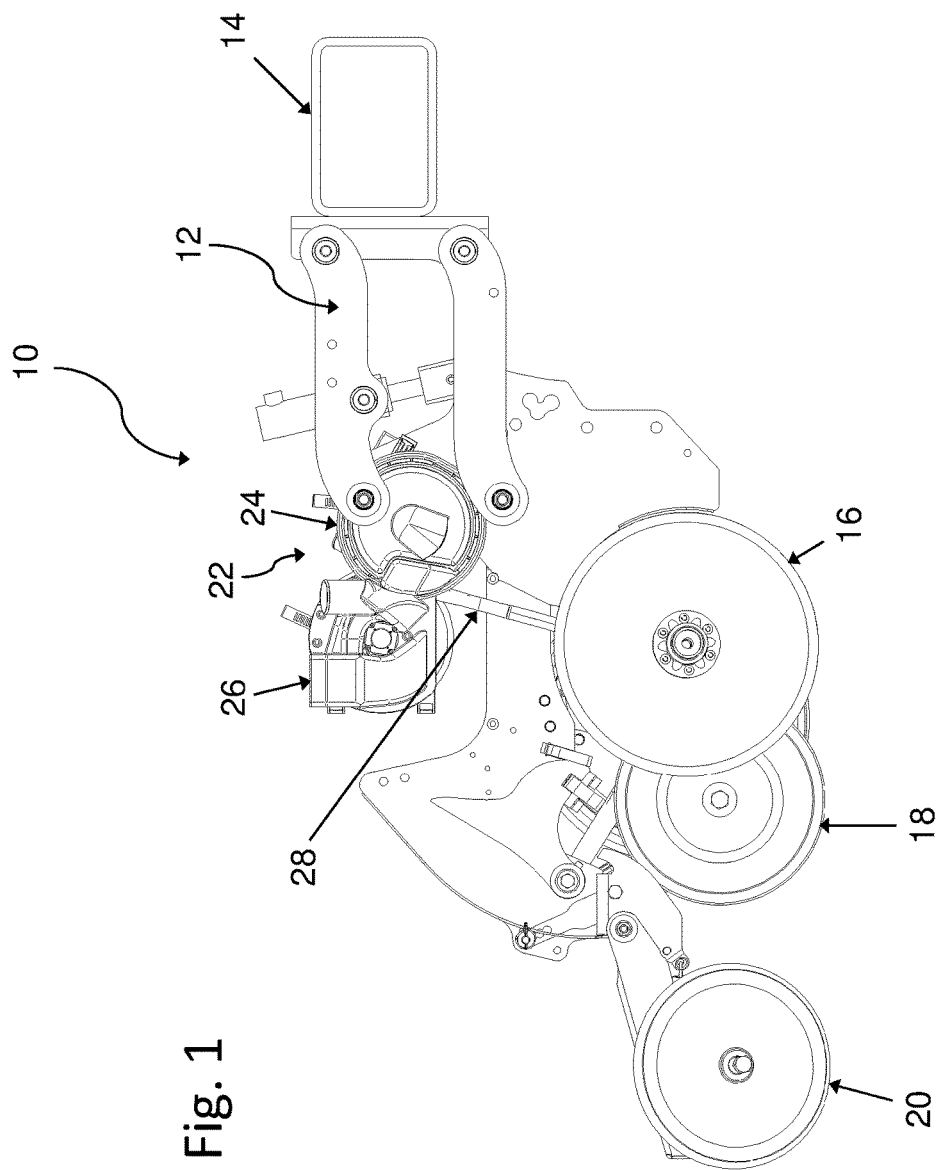
FIG. 1 depicts a schematic side view of a row unit of an agricultural machine according to a first embodiment.

FIG. 1 depicts a side view of a row unit 10 of an agricultural machine in the form of a seed singulating machine. Such machines are used in agriculture for an individual dispensing of granular grains such as seeds and/or fertilizer. Row unit 10 is connected to frame 14 of the machine via a support device 12 in form of a rhomboid. Row unit 10 further consists of furrowing tools, which form in particular two coulters 16 that are aligned at an angle towards each other. A catching element 18 is arranged subordinately to the coulters 16 or in such a way that it reaches in between these. It is designed as a roller that should catch and slow down the grains that are to be dispensed after they have been placed in the furrow. At the rear end of the row unit 10, two rollers 20 are arranged as furrow closing tools.

A metering system 22 is arranged at row unit 10 in the embodiment, which consists of two metering devices 24, 26. Metering system 22 is part of row unit 10 in the depicted illustration. But it would also be possible that it could be set at a distance from the row unit 10 and that it could be arranged, for example, at the frame of the machine. A seed metering pipe 28 is arranged at the lower end of metering system 22, by means of which the grains, which were separated by the metering devices 24, 26, can be transported into the seed furrow. The section of the seed metering pipe 28 that reaches into the metering elements can also be described as seed inlet element 27.

Figure 2:
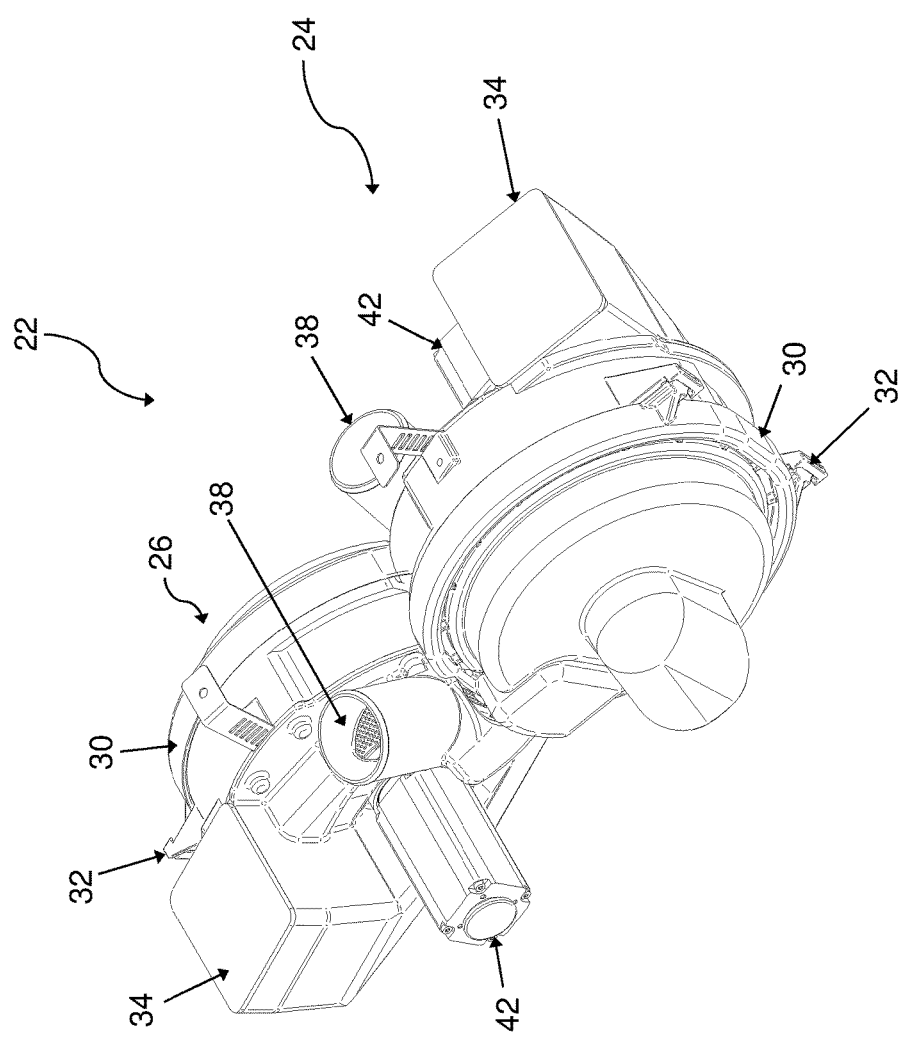
FIG. 2 depicts a perspective view of an embodiment of the metering system according to the invention.

Metering system 22 according to the invention is depicted in a perspective view in FIG. 2. Metering system 22 is made up of a front and a rear metering device 24, 26. In the depicted embodiment of FIG. 2, the two metering devices 24, 26 are constructed in an identical way. But metering devices 24, 26 are arranged facing towards each other in way that they are twisted about theirrespective axes. Metering devices 24, 26 consist of a respective multipart housing 30, which may comprise, for example, a front and a rear housing part. The housing parts are connected by means of hinges 32 and/or locking elements. Housing 30 features a respective air inlet 38, by means of which its metering devices 24, 26 can be supplied with the appropriate pressure level. The metering devices 24, 26 are supplied with material that needs to be dispensed in form of grains via a seed supply line 34 or via a not depicted seed reservoir 36. The seeds are preferably different kinds of materials. The supply of the metering devices 24, 26 can be accomplished, for example, by means of a container or by means of a pneumatic conveyor system that is attached to the row unit. In order to be able to vary the amount of seeds that will be transported, additional sliders 40 are arranged on the metering devices 24, 26. Slider 40 can be used to open or close the seed reservoir 36 in gradual stages. Each metering devices 24, 26 is powered by a drive motor 42. Electrical or hydraulical versions or motor drives can be used.

Figure 3:
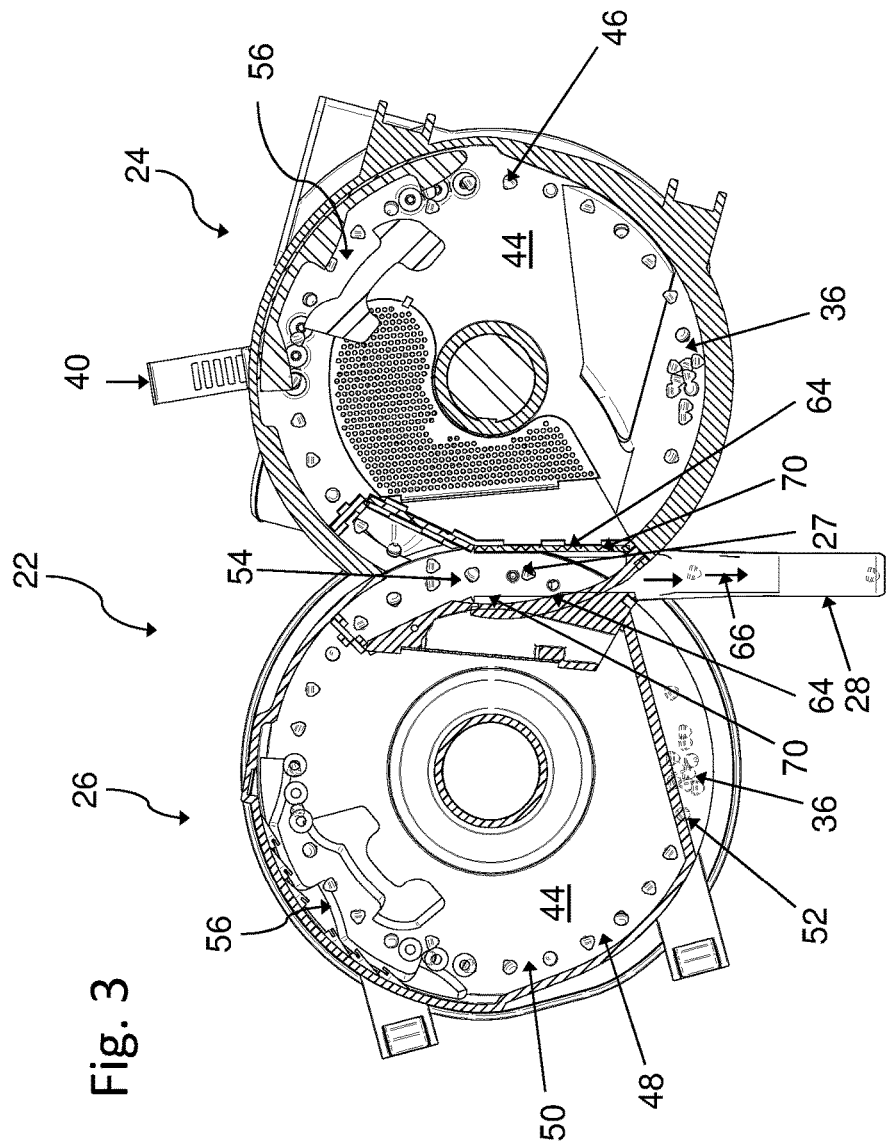
FIG. 3 depicts a cross sectional side view of one embodiment of the metering system according to FIG. 2.
Figure 4:
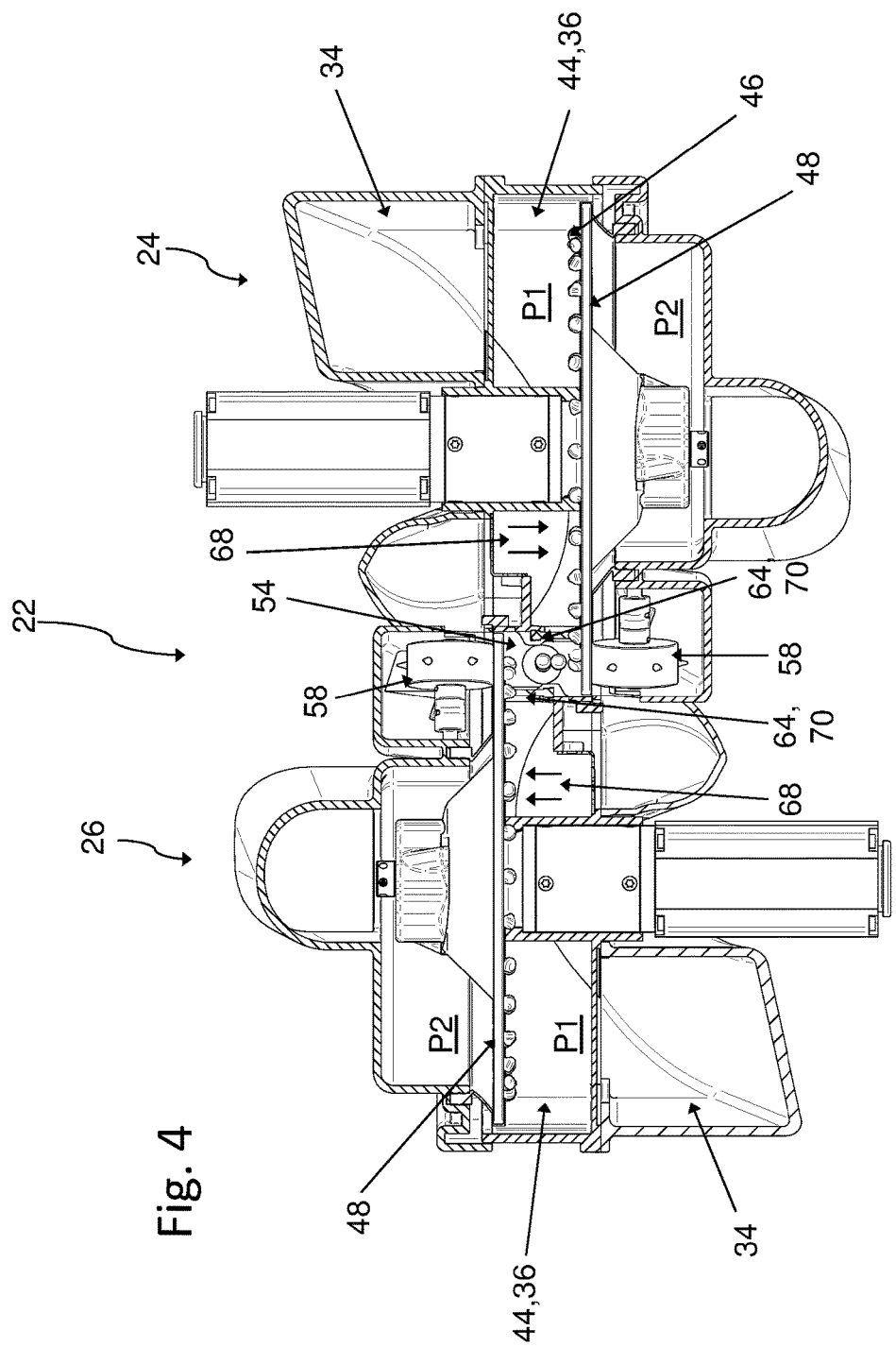
FIG. 4 depicts a cross sectional top view of the metering system according to FIG. 2.
Figure 5:
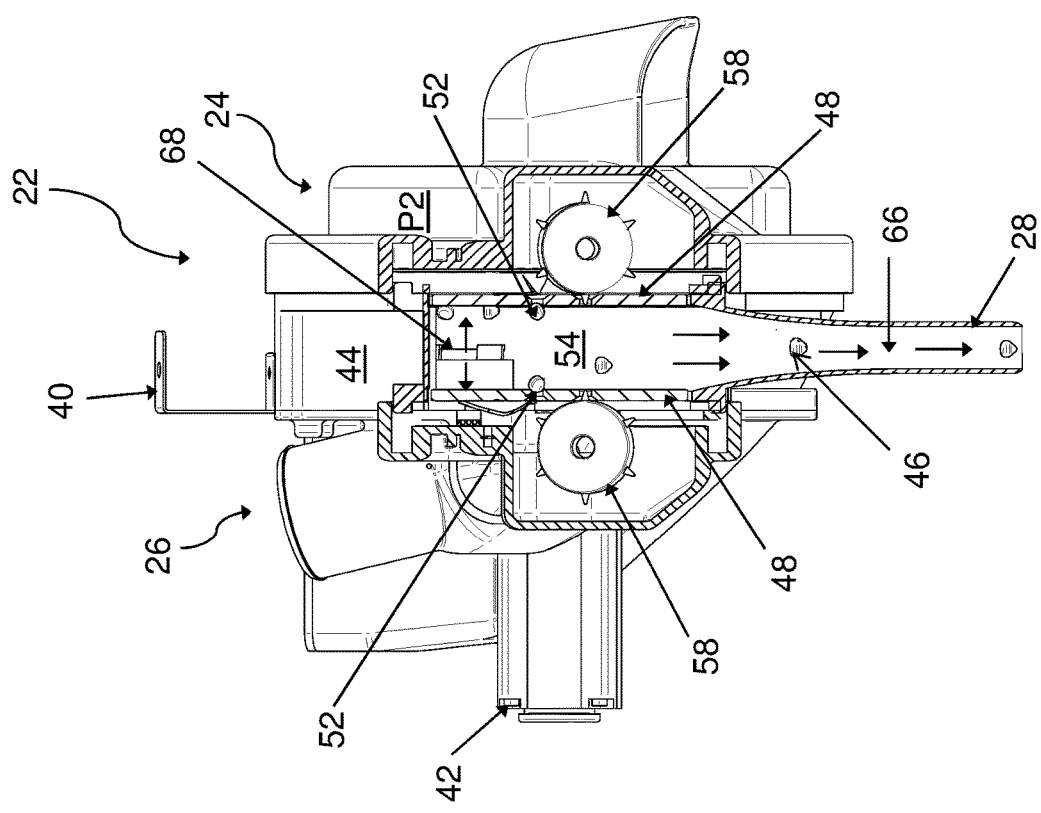
FIG. 5 depicts a cross sectional front view of the metering system according to FIG. 2.

FIGS. 3, 4 and 5 depict different respective views of the combination of the two metering devices 24, 26 according to FIG. 2. Parts of housing 30 or parts that are not needed for the description are accordingly not shown or depicted in cross section for a better understanding.

Metering system 22 consists of two metering devices 24, 26. They are constructed in the same manner, but are arranged facing towards each other in way that they are twisted about their respective axes. The metering devices 24, 26 consist of one respective chamber or of one common chamber 44, which is supplied with the seeds that are to be dispensed or with the corresponding grains 46. In an embodiment with one common chamber 44, they are divided by means of a dividing element. This ensures that the different kinds of seeds will not be mixed. Preferably, dividing elements are used which allow air to pass through.

Chambers 44 or the common chamber 44 is pressurized with a pressure level P1, which is produced, for example, by a pressure application device that is attached to the machine. For example, it is possible to use high pressure blowers for this purpose.

A metering element 48 is rotating within metering devices 24, 26, which is designed in the form of a disc in the present embodiment. Cut-outs 52 are arranged in regular intervals along at least one curved path 50 on the respective metering element 48. The cut-outs 52 are made in the form of bore holes in the present example. But it is also possible that the cut-outs 42 are designed as elongated holes and/or slots, or the like. Furthermore, the cut-outs 52 in the metering devices 24, 26 can feature different sizes and contours which can be adapted to or chosen according to the grain sizes that are to be dispensed. Metering element 48 forms a respective border to chamber 44, whereby a connection to the area with a lower pressure level P2 is created by means of the cut-outs 52. A pressure difference is thus created at each one of the cut-outs 52. As a result, grains 46 can be received in eachcut-out 52. The grains which were picked up by the cut-outs 52 can be transported to one seed dispensing area 54 by the rotation of the metering element 48.

A separating device or a separating element 56 is arranged between the seed reservoir 36 and the seed dispensing area 54. These correspond to the object of EP 1 928 223 B1, as was already mentioned earlier. But it would also be possible to use a variety of other separating elements 56. By means of these separating devices 56, excess grains 46 and grains which are sticking to the cut-outs 52 can be expelled, so that only one respective grain remains in the cut-outs 52.

The metering devices 22 consist of one common seed dispensing area 54, which means that different kinds of seeds are separated by the metering devices 24; 26, respectively. The grains which are held by the cut-outs are transported to the common seed dispensing area 54 by the rotation of the metering elements 48. By means of an interruption of the pressure difference by interrupting elements 58, the grains are pushed into a seed metering pipe 28 that is arranged at the seed dispensing area 54 via a seed inlet element 27. For example, the interrupting elements 58 can be designed as a roller. The seed inlet element 27 defines a section of the seed metering pipe 28, which merges into the common seed dispensing area 54.

Just like the chambers 44, seed dispensing area 54 can also be pressurized. In the present embodiment, this is accomplished by means of an active connection between the chambers 44 and the seed dispensing area 54, which means that no further air supply is needed and the pressure level in the chambers 44 and in the seed dispensing area 54 is basically the same.

By means of the air pressure within seed dispensing area 54, an air stream is created due to the lower pressure in the seed metering pipe 28. After the grains 46 are released from the metering element 48, they are picked up by the air stream, by means of which the grains 46 are actively accelerated within the seed metering pipe 28 by a seed inlet element 27. This largely prevents a bouncing of the grains 46 within the seed metering pipe 28 or at least reduces it to such an extent that it does not have any or at least only an insignificant influence on the dispensing accuracy.

The seed metering pipe 28 or the seed inlet 60 is designed in such a way that it enlarges within the seed dispensing area 54 and then narrows down in its further course. The advantage of this is that there is sufficient space for the grains 46 in the seed dispensing area 54 to be securely received by the seed metering pipe 28.

A change of direction of the grains 44 occurs in the seed dispensing area 54 from a circular motion along a curved path 50 into a mainly tangential and/or straight direction with regards to the curved path 50. This is accomplished via a redirecting of the air streams, which are directed as respective perpendicular air streams 68 towards the cut-outs 52 inside the chambers 44 into a guided air stream 66, which is guided along the seed metering pipe 28 and/or the guiding element 64 that is arranged to the seed dispensing area 54.

Additionally, the guiding element 64 features a guiding path 70, which follows at least partially the same direction as the seed metering pipe 28. A guided air stream 66 can thus be produced. The air stream can also be produced by an active connection with at least one chamber 44. But a separate air supply would also be possible.

Furthermore, the curved path 50, the guiding element 64 and the seed metering pipe 28 are arranged in such a way that any element, such as grains 44, dirt particles or the like, which reach the grain dispensing area 54, are forcibly dispensed via the guiding path into the seed metering pipe 28. This reduces the susceptibility to dirt tremendously. In order to further improve this, a push-out roller 58 is arranged for the metering elements 48 or for the seed dispensing areas 54 on the respective side that is facing away from the grains 46. In this way, any grains 46 and/or dirt particles that possibly remain in the cut-outs 52 after the grain dispensing, can be removed and dispensed into the seed metering pipe 28 via the seed inlet element 27.

In the embodiment of FIGS. 3 to 5, only one respective grain dispensing is performed by only one metering device 24, 26. But the other metering device 24, 26 is filled with grains 44 until directly before the seed dispensing area 54 or up to the interrupting element. This enables a quick switching between the metering devices 24, 26, so that the metering devices 24, 26 do not need any waiting time before they can dispense the grain.

In FIGS. 1 to 5, the metering devices 24, 26 are twisted about their respective axes and arranged in parallel with an offset between each other. In FIGS. 6A and 6B, another possible arrangement of the metering devices 24, 26 or of the metering elements 48 is made evident in a perspective view and in a top view.

The metering elements 48 are arranged at a respective angle towards each other. A seed metering pipe 28, which consists of a seed inlet 60 merges towards the lower right side. The upper section of the seed metering pipe 28 defines the seed inlet element 27. The metering elements 48 directly touch and slide on the respective seed inlet 60 or the seed metering pipe 28. This means that the distance of the metering elements 48 towards each other at the seed dispensing area 54 is less than the diameter of the seed metering pipe 28. As a result, the respective bow-shaped contour 62 of the seed metering pipe 28 is interrupted on the side that is facing towards the metering elements 48. The advantage of this is that there are no edges of the seed metering pipe 28 that touch the metering element 48. This leads to an improvement of the grain dispensing.

Figure 7:
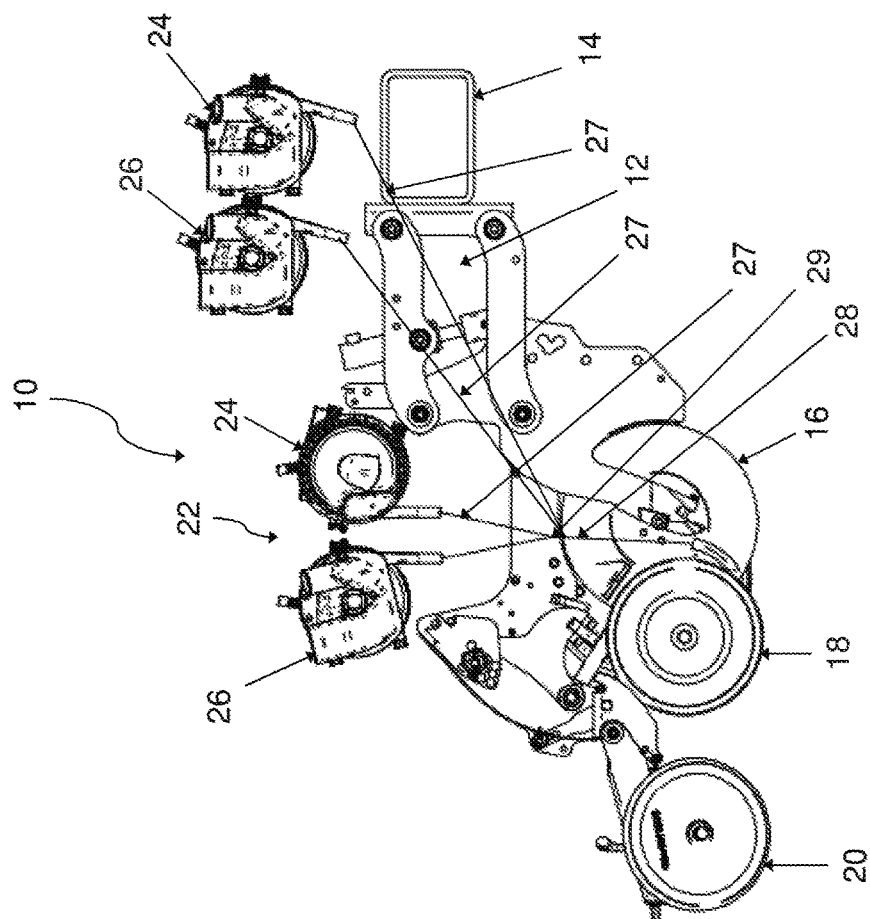
FIG. 7 depicts a schematic side view of a row unit of the agricultural machine according to a second embodiment.

FIG. 7 also depicts a side view of an embodiment of a row unit 10 according to a second design form. This design form also consists of metering system 22. While one of the two metering systems is a direct part of row unit 10, the other one is intended to be mounted onto frame 14. One respective seed inlet element 27 is assigned to both metering devices 24, 26. The two seed inlet elements 27 can be connected to one seed metering pipe 28 by means of a connecting piece 29. The connecting piece 29 is designed in a Y-shape. But a variety of other connecting pieces or connecting possibilities would also be conceivable. But in any case, the connecting pieces are designed in such a way that the at least two seed inlet elements 27 are joined into a common seed metering pipe 28. The joining of the respective seed inlet elements 27 is done at row unit 10, whereby other locations would also be possible or conceivable, in particular directly after the metering devices 24, 26. The advantage of such a joining is that only one respective seed metering pipe 28 has to be placed at the row units 10 and not two seed inlet elements 27.

Figure 8:
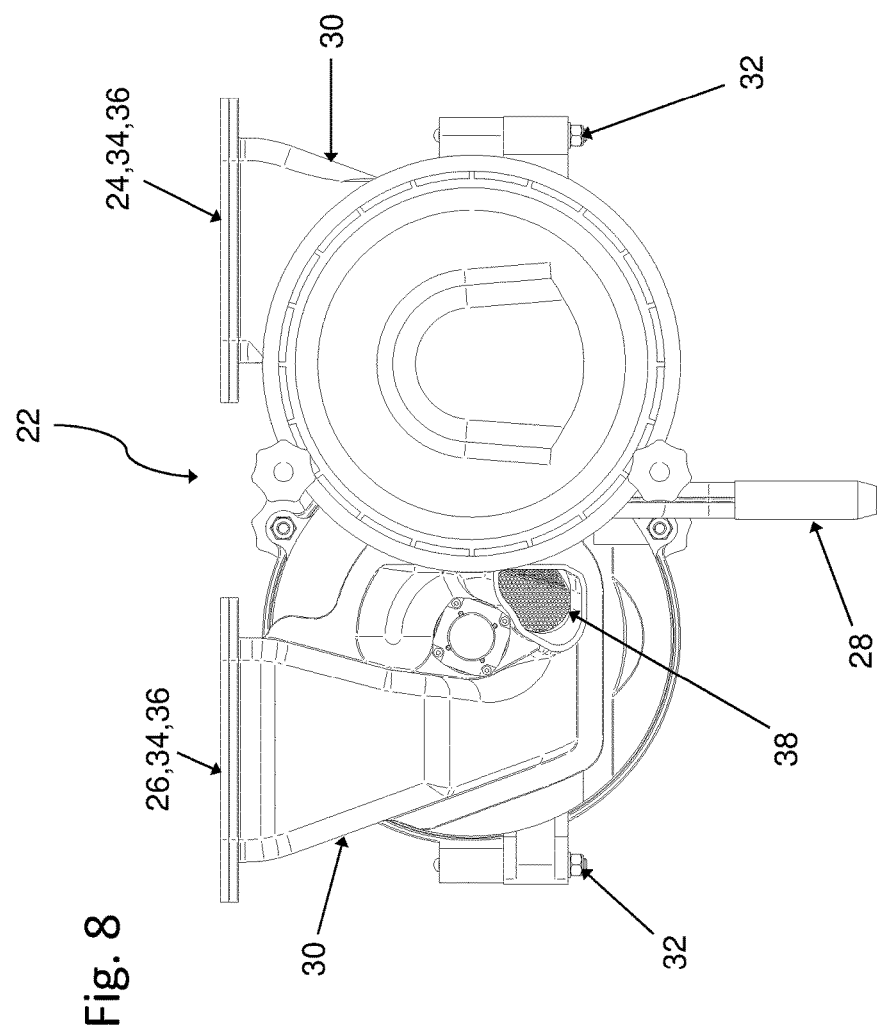
FIG. 8 depicts a side view of an embodiment of the metering system according to the invention according to FIG. 7.

Metering system 22 is depicted in a side view in FIG. 8. Metering system 22 is made up of a front and a rear metering device 24; 26. In the depicted embodiment of FIG. 8, the two metering devices 24, 26 are constructed in an identical way. But they are arranged towards each other in way that they are twisted around their respective axes. Metering devices 24; 26 consist of a respective multipart housing 30, which may, for example, comprise a front and a rear housing part. The housing parts are connected by means of hinges 32 and/or locking elements. Housing 30 features a respective air inlet 38, so that the metering devices 24, 26 can be supplied with the appropriate pressure level. The metering devices 24, 26 are supplied with material that needs to be dispensed in form of grains via a seed supply line 34 or via a seed reservoir 36 which is not depicted. The materials are preferably of different kinds. The supply of the metering devices 24, 26 can be accomplished, for example, by means of a container or by means of a pneumatic conveyor system that is attached to the row unit. In order to be able to vary the amount of seeds that will be transported, additional sliders 40 are arranged on the metering devices 24, 26. Sliders 40 can be used to open or close the seed reservoir 36 in gradual stages. Each metering device 24, 26 is powered by a drive motor 42. This can be a mechanical, an electrical or hydraulic drive, etc.

Figure 9:
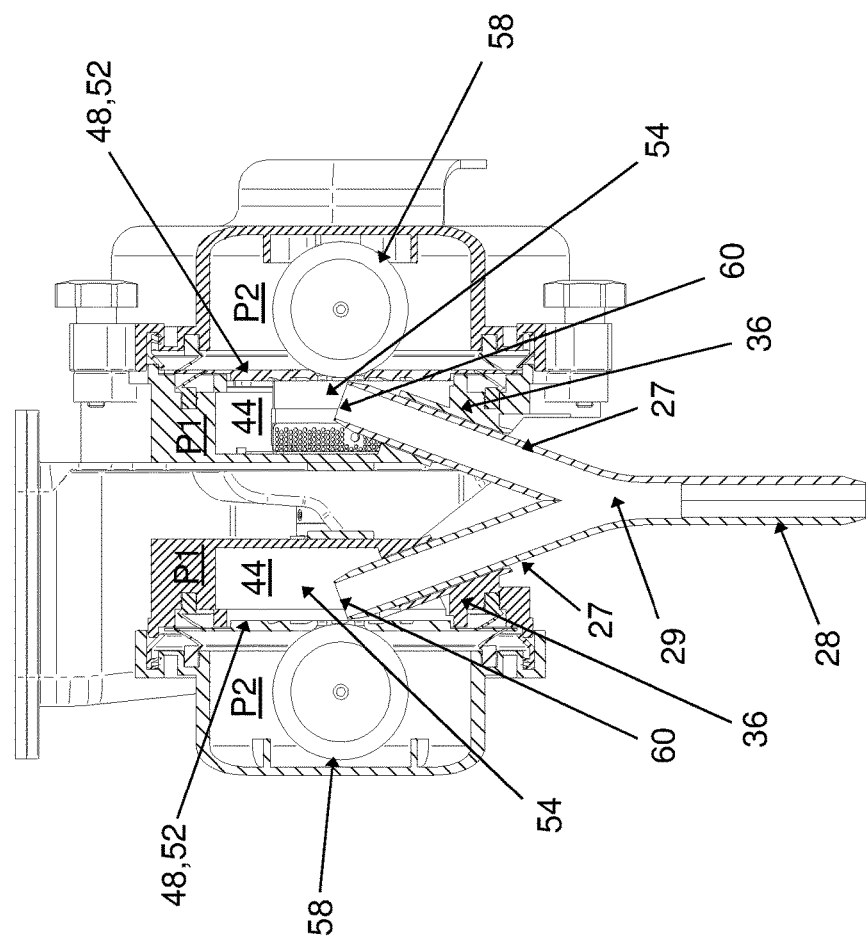
FIG. 9 depicts a front view of the metering system according to FIG. 7 in a cross section.

FIG. 9 depicts the arrangement of the two metering devices 24, 26 in a frontal cross section. Parts of housing 30 or parts that are not needed for the description are accordingly not shown or depicted in cross section for a better understanding.

Metering system 22 consists of two metering devices 24, 26. In the depicted embodiment, the two metering devices 24, 26 are constructed mainly in an identical way. Furthermore, the metering devices 24, 26 are arranged towards each other in way that they are twisted about their axes or about the axis of the seed metering pipe 28. The metering devices 24, 26 each consist of one respective chamber 44. Each chamber 44 can be supplied with seeds that are to be dispensed or with corresponding grains 46.

Chambers 44 are pressurized with a respective pressure level P1, which is produced, for example, by a pressure application device in form of a high pressure or vacuum blower that is attached to the machine.

A metering element 48 is rotating within each of the metering devices 24, 26, which are designed in the form of a disc in the present embodiment. The respective metering element 48 consists of cut-outs 52 that are arranged in regular intervals along at least one curved path 50. The cut-outs 52 are made in form of bore holes. But it is also possible that the cut-outs are designed as elongated holes and/or slots or the like. Furthermore, the cut-outs 52 in the metering devices 24, 26 can feature different sizes and contours which can be adapted to or chosen according to the grain sizes that are to be dispensed. Metering elements 48 form a border to chamber 44, respectively. A respective connection to an area with a lower pressure level P2 is achieved by means of the cut-outs 52. A pressure difference is thus created at each one of the cut-outs 52. Among other things, the pressure difference assists the receiving of grains by the respective cut-outs 52. The picked up grains can subsequently be transported to one seed dispensing area 54 by the rotation of the metering elements 48.

The metering devices 22 consist of one respective seed dispensing area 54, which means that different kinds of seeds are separated by the respective metering devices 24, 26 and then transported to the seed dispensing area 54 by the rotation of the metering elements 48. The grains that are held in the cut-outs 52 are subsequently released into a seed inlet element 27 that is arranged at the seed dispensing area 54 and/or into a seed metering pipe 28 by means of an interruption of the pressure difference by interrupting elements 58. The interrupting elements 58 can be designed, for example, in the form of a roller. Depending on the embodiment, the interrupting elements 58 can work alternately, so that one respective grain is released from the first seed dispensing area and subsequently one grain from the second seed dispensing area into the seed metering pipe 28. It is also possible that only one interrupting element 58 of one chamber 44 is active, by means of which only the same kind of seeds can be dispensed into the ground.

Just like the chambers 44, seed dispensing area 54 can also be pressurized. In the present embodiment, this is accomplished by means of an active connection between the chambers 44 and the seed dispensing area 54. This means that no further air supply is needed and the pressure level in the chambers 44 and in the seed dispensing area 54 is basically the same.

By means of the air pressure that is present in at least one seed dispensing area 54, an air stream is created due to the lower pressure in the seed metering pipe 28. After the grains 46 are released from the metering element 48 they are picked up by the air stream.

Thus, the grains 46 are actively accelerated within the seed metering pipe 28. Furthermore, this largely prevents a bouncing of the grains 46 within the seed metering pipe 28 or at least reduces it to such an extent that is has no or at least only an insignificant influence on the dispensing accuracy.

The seed metering elements 27 are arranged at an angle towards metering element 48, so that their seed inlet 40 also features an angle towards it. In order to avoid interfering edges or the like and to keep the distance between metering element 48 and seed inlet 40 as small as possible, seed inlet elements 27 are beveled on the respective side that is facing the metering elements 48.

Figure 10:
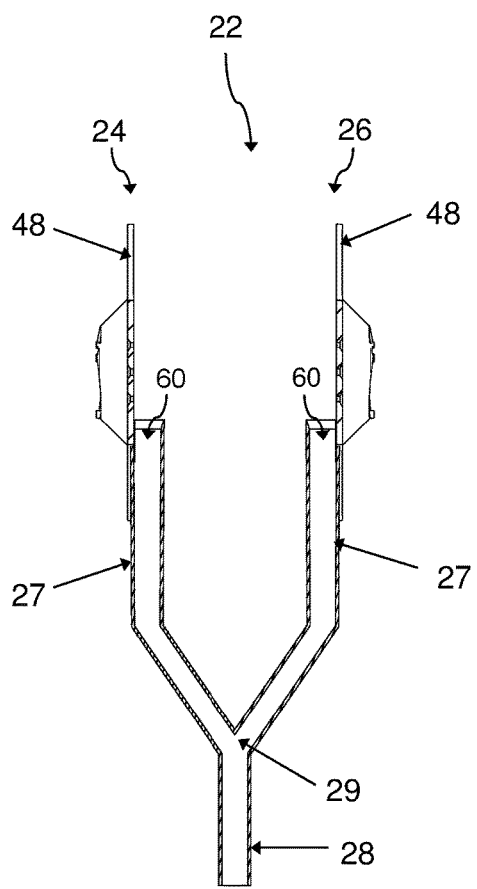
FIG. 10 depicts a front view of the metering system according to FIG. 7 in a cross section, wherein the metering elements touch and slide on the seed inlet elements.

FIG. 10 depicts a front view of the metering system 22 in a cross section, wherein the metering elements 48 directly touch and slide on the seed inlet elements 27. By means of such an arrangement, edges between metering elements 48 and the seed inlet elements 27 are prevented. Thus, the grain dispensing can be improved accordingly. The diameter of the seed inlet elements 27 in the seed dispensing area is furthermore adapted to correspond to the touching and sliding, which can also improve the grain intake by means of the seed inlet elements 27. The invention was described with reference to a preferred embodiment. But it is still possible for a skilled person to make adaptions and changes to the invention without leaving the scope of protection of the following claims.

LIST OF REFERENCE SIGNS 10 row unit
12 support device
14 frame
16 coulter
18 catching element
20 roller
22 metering device
24 front metering device
26 rear metering device
27 seed inlet element 28 seed metering pipe
29 connecting piece
30 housing
32 hinge
34 seed supply line
36 seed reservoir
38 air supply
40 slider
42 motor
44 chamber
46 grains
48 metering element
50 curved path
52 cut-outs
54 grain dispensing area
56 separating device, separating element
58 push-out roller
60 seed inlet
62 bow-shaped contour
64 guiding elements
66 guided air stream
68 perpendicular air stream
70 guiding path

What is claimed is:

1. A metering system for a row unit of an agricultural machine for an individual dispensing of grains, comprising
at least two metering devices, whereby the at least two metering devices include at least one chamber for carrying a quantity of the grains that are to be dispensed,
at least two metering elements that establish a border to the at least one chamber, whereby the at least two metering elements are rotatably mounted within the housing of the at least two metering devices and each of the metering elements includes openings, which are arranged along a curved path at regular intervals for picking up grains, and
at least one grain dispensing area, which is defined by the at least one chamber and by the at least two metering elements, wherein the at least one grain dispensing area is adjacent a seed inlet element for a seed metering pipe through which the separated grains are dispensed into a seed furrow in the soil, and
whereby a pressure application device, in communication with the at least one chamber or to a pipe of the air supply of the at least one chamber or in communication with both the at least one chamber and to the pipe of the air supply of the last least one chamber, operably produces a stream of air in the grain dispensing area having a pressure that is sufficiently greater than ambient pressure such that the grains released from a selected metering element are accelerated by the stream of air into the seed metering pipe.

2. The metering system according to claim 1, in which the pressure application device comprises a Venturi nozzle or a ring nozzle.

3. The metering system according to claim 1, in which the at least one seed inlet element comprises first and second seed inlet elements joined together by a Y-shaped connecting piece and the at least one chamber comprises first and second chambers, wherein the first and second seed inlet elements are positioned adjacent the first and second chambers respectively.

4. The metering system according to claim 1, in which the metering elements are formed as a disc or drum and whereby the openings in the metering elements comprise bore holes or elongated holes or slots.

5. The metering system according to claim 4, in which the openings are arranged along a curved path on the at least two metering elements and the at least one seed inlet element extends tangentially relative to the curved paths of the respective metering device.

6. The metering system according to claim 1, in which the at least two metering devices are enclosed in one common housing and the at least one chamber is divided by a dividing wall.

7. The metering system according to claim 6, in which a guiding element is associated with the at least two metering devices, wherein the guiding element features a guiding path which is aligned at least partially parallel to the seed metering pipe and by means of which a change of direction of the grains can be accomplished, from a circular direction along a curved path into a linear direction towards the seed metering pipe.

8. The metering system according to claim 6, in which the at least two metering elements comprise first and second metering elements that are arranged facing towards each other at an acute angle.

9. The metering system according to claim 8, in which the first and second metering elements can be rotated at different speeds relative to each other or at the same speed.

10. The metering system according to claim 9, in which the movement of the first metering element can be transmitted to the second metering element by means of transmission devices.

11. The metering system according to claim 9, in which the respective speeds of the first and second metering elements are adjustable relative to each other.

12. The metering system according to claim 6, in which the metering elements are rotatable in opposite directions relative to each other.

13. The metering system according to claim 6, in which the at least two chambers are supplied with different kinds of seeds.

14. The metering system according to claim 1, in which the at least two metering elements abut and rotate relative to the seed metering pipe adjacent the seed inlet element thereof with the seed inlet element aligned with and extending generally tangential to the curved path of the openings in the respective metering element of the at least two metering elements.

* * * * *